United States Patent
Borowski et al.

(10) Patent No.: US 6,814,494 B2
(45) Date of Patent: Nov. 9, 2004

(54) SEALED SPHERICAL ROLLER BEARING FOR DRAGLINE SWING SHAFT

(75) Inventors: Richard Borowski, Canton, OH (US); Jeff S. Calvin, Canton, OH (US); Joseph Vito, North Canton, OH (US); Maynard L. Oxley, Canton, OH (US); Hiroshi Marunaka, Shanghai (CN)

(73) Assignee: The Timken Company, Canton, OH (US)

(*) Notice: Subject to any disclaimer, the term of this patent is extended or adjusted under 35 U.S.C. 154(b) by 52 days.

(21) Appl. No.: 10/420,382

(22) Filed: Apr. 22, 2003

(65) Prior Publication Data
US 2003/0198416 A1 Oct. 23, 2003

Related U.S. Application Data

(60) Provisional application No. 60/374,866, filed on Apr. 23, 2002.

(51) Int. Cl.[7] ................................................ F16C 19/38
(52) U.S. Cl. ........................................ 384/484; 384/568
(58) Field of Search ................................. 384/484, 486, 384/568, 571, 477

(56) References Cited

U.S. PATENT DOCUMENTS

| 3,957,319 A | 5/1976 | Gorski |
| 4,697,937 A | 10/1987 | Karlsson et al. |
| 5,104,239 A | 4/1992 | Sague |
| 5,462,367 A | 10/1995 | Davidson et al. |

FOREIGN PATENT DOCUMENTS

| EP | 0450793 A2 | 10/1991 |
| EP | 0450793 A3 | 4/1992 |

Primary Examiner—Lenard A Footland
(74) Attorney, Agent, or Firm—Polster, Lieder, Woodruff & Lucchesi, L.C.

(57) ABSTRACT

A spherical roller bearing having a sealing arrangement and a closure arrangement to prevent the loss of lubricants from the bearing and to prevent the entrance of contaminants into the bearing.

48 Claims, 2 Drawing Sheets

US 6,814,494 B2

SEALED SPHERICAL ROLLER BEARING FOR DRAGLINE SWING SHAFT

CROSS-REFERENCE TO RELATED APPLICATIONS

This application is related to U.S. Provisional Patent Application No. 60/374,866 filed Apr. 23, 2002 from which priority is claimed.

STATEMENT REGARDING FEDERALLY SPONSORED RESEARCH OR DEVELOPMENT

Not applicable.

BACKGROUND OF THE INVENTION

1. Field of the Invention

This invention relates in general to a spherical roller bearing and, more particularly, to a spherical roller bearing having specialized seals.

2. Description of Related Art

Spherical roller bearings are generally used wherever there is a likelihood that axial misalignment will occur. The internal arrangement of spherical roller bearings allows the inner ring of the bearing to become axially misaligned with the outer ring of the bearing while still maintaining the ability of the bearing to provide reduced rolling friction.

The arrangement of the internal components of a spherical roller bearing presents special problems with regard to sealing the bearing from outside contaminants and for retention of lubricants within the bearing. Most bearing seals use a relatively solid seal member which is firmly attached to either the inner ring or the outer ring of the bearing, with the other edge of the seal in wiping contact with the other race. As such, there is little, if any, ability of such seals to tolerate any axial misalignment because the misalignment of one race with the other will separate the seal material from being in wiping contact with the other race, thus allowing lubricants to leak from the bearing and allowing contaminants to enter into the internal bearing components. The loss of lubricant and the entrance of contaminants into the bearing cause rapid wear and deterioration of the bearing which results in high maintenance and high cost.

One application of spherical roller bearings is in dragline machines used in the mining industry. Dragline machines are a common piece of mining equipment used in strip mines, surface mines, and canal building. Generally, a dragline machine is usually an enormous motorized crane having a boom and cables which drag a scoop across the surface of the ground to dig and gather material for relocation to another place. Once the scoop is filled, the boom of the dragline machine is repositioned by rotating the entire dragline machine on a central shaft. This central shaft and its accompanying pinion shaft, so-called swing shafts, are vertical and is normally lubricated by high grade lubricants. Because the bearings for the dragline shafts are mounted vertically and because the environment of dragline machines usually contains a wide variety of harmful and penetrating contaminants, the use of a traditional labyrinth-type seal allows the bearings for the dragline shafts to loose their lubricants and to allow contaminants to enter the bearing. This bearing contamination and loss of lubricant cause the bearing to wear quickly resulting in frequent replacement of the bearing. Such rapid and unexpected wear can result in catastrophic failures requiring major repairs to the drive train of the dragline excavating equipment that can result in many hours of equipment downtime.

Various designs have been used to prevent this problem. In some cases shield plates have been positioned near the bearings. While shield plates have been partially successful in preventing the entrance of some contaminants into the bearing, these plates fail to retain the lubricants within the vertically positioned bearing and allow the bearing's lubricants to leak from the bottom of the bearing. This loss of lubricant results in excessive bearing wear and bearing damage. Altogether, there has been no solution to this problem and failures of the dragline shaft bearings have caused a significant amount of cost, labor, and down time to the mining operators due to bearing maintenance and replacement.

The present invention overcomes these and other problems by providing a spherical roller bearing which is capable of allowing misalignment of the inner ring with the outer ring while still providing a seal between the races to keep lubricants within the bearing and contaminants out. Additionally, the present invention provides specially design closure devices which further inhibit the entrance of contaminants into the bearing.

SUMMARY OF THE INVENTION.

The present invention resides in a spherical roller bearing having the ability to allow for a certain amount of axial misalignment while still maintaining a seal between the inner and outer ring through the use of a uniquely designed seal and through the use of closure plates around the bearing surfaces.

More specifically, the present invention includes uniquely design contact seals which are used on both ends of the bearing. To further enhance the sealing performance of the present invention, closure plates are also used to surround and protect the bearing from outside contaminants.

The present bearing is also a unique design which allows the spherical bearing to be utilized as a packaged bearing which can be installed as a unitized assembly acting as a cartridge-type replacement bearing. The seals, flanges and wear rings of the present invention allow the installer of the bearing to manipulate and install the bearing without damaging the bearing or the components of the bearing during installation. In furtherance of this object, the present invention is also pre-lubed, pre-adjusted, and pre-sealed prior to transportation to the installation point of the bearing. In fact, the present bearing is sealed and lubed for the expected lifetime of the bearing.

Other objects and features of the present invention will be in part apparent and in part pointed out hereinafter.

DESCRIPTION OF THE DRAWINGS

Corresponding reference characters indicate corresponding parts throughout the several views of the drawings.

DETAILED DESCRIPTION OF THE INVENTION

While there are a number of embodiments of the present invention, the particular embodiment described herein is a spherical roller bearing for use on the shaft of a dragline mining machine.

Figure 1:
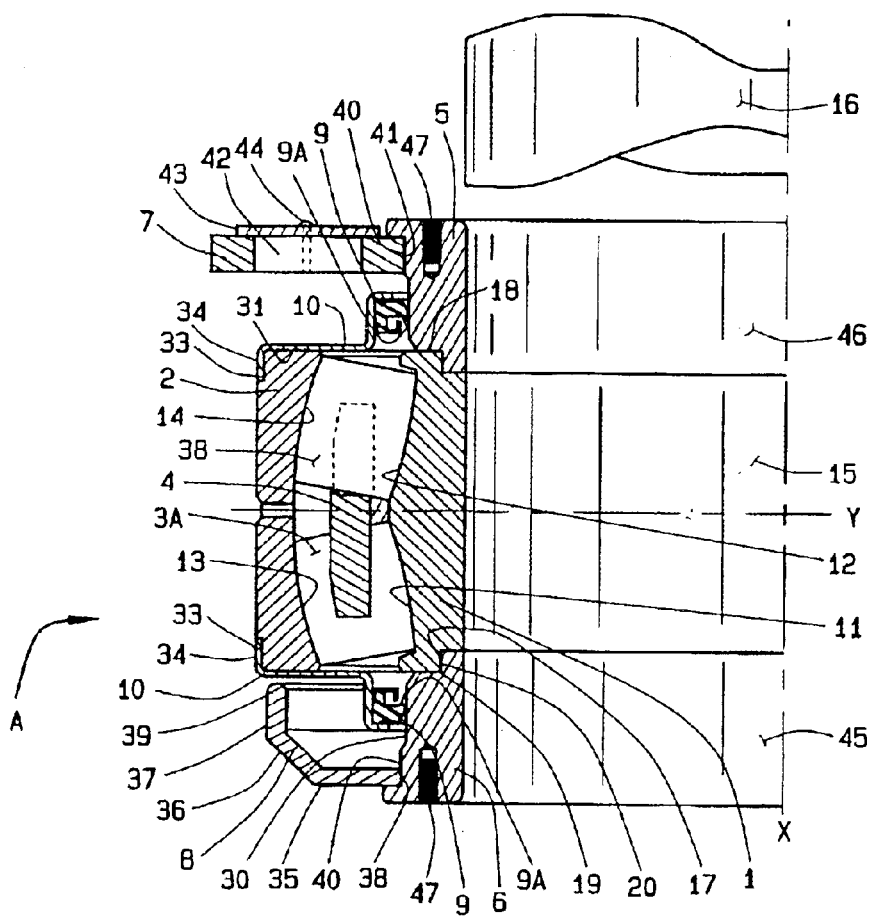
FIG. 1 is a sectional view of the spherical roller bearing of the present invention.

Referring now to the drawings, FIG. 1 illustrates a spherical roller bearing A. The spherical roller bearing A includes the traditional components of an inner ring 1, an outer ring 2, a set of spherical rollers 3, and a cage 4. Also included in the spherical roller bearing A, however, are other sealing components which act to protect and seal the bearing components. These sealing components include an upper seal wear ring 5, a lower seal wear ring 6, an upper closure ring 7, a lower closure ring 8, two contact lip seals 9, and two seal carriers 10.

Inner ring 1 and outer ring 2 each having spaced oppositely inclined raceways, the inner raceways being identified as 11 and 12, and the outer raceways being identified as 13 and 14. A first row of spherical rollers 3A contacts and rolls on the opposed raceways 11 and 13, and a second row of spherical rollers 3B contacts and rolls on the opposed raceways 12 and 14. The spherical rollers 3A and 3B are spaced by a cage 4. The inner ring 1 is provided with a central bore 15 to receive the dragline shaft 16. All raceways 11, 12, 13, and 14 have a curvature conforming to the curvature of the spherical rollers.

The inner ring 1 has two locking offsets 17 in the front face 18 and the back face 19 of the inner ring 1. The upper seal wear ring 5 is attached to the front face 18 and the lower seal wear ring 6 is attached to the back face 19 of the inner ring. The upper seal wear ring 5 and the lower seal wear ring 6 each have a locking shoulder 20. The locking offset 17 and the locking shoulder 20 coordinate to lock the upper seal wear ring 5 to the front face 18 of the inner ring 1 and the lower seal wear ring 6 to the back face 19 of the inner ring 1. In combination, these elements constitute a locking arrangement between the inner ring and the upper and lower seal wear rings 5 and 6.

Figure 2:
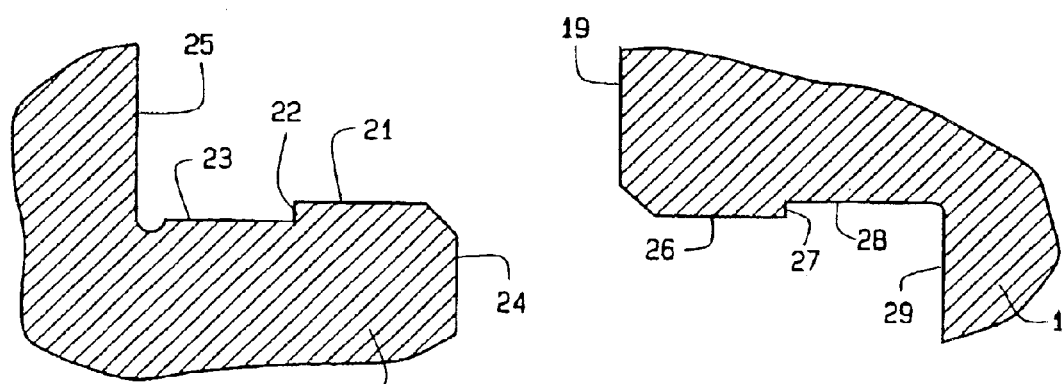
FIG. 2 is a sectional view of the locking arrangement between the seal wear plates and the races of the present invention.

FIG. 2 shows the details of this locking arrangement between lower seal wear ring 6 and the inner ring 1. It is understood that the locking arrangement between the lower seal wear ring 6 and the inner ring 1 is the same as the locking arrangement between the upper seal wear ring 5 and the inner ring 1, except that the latter is a mirror image of the former. The lower seal wear ring 6 has a first annular lip 21, a first offset 22, a first annular groove 23, a first front face 24, and a first offset face 25. The inner ring 1 has a second annular lip 26, a second offset 27, a second annular groove 28, a second offset face 29, and the front face 19.

In assembly, the lower seal wear ring 6 is aligned and force-fitted into the inner ring 1. In fact, there is an interference fit between the lower seal wear ring 6 and the inner ring 1. The lower seal wear ring 6 is forced into the inner ring 1 until the first front face 24 is very close to the second offset face 29. The first offset face 25 will contact the back face 19 of the inner ring 1 before the first front face 24 and the second offset face 29 can contact each other. The first annular lip 21 will be in locking engagement with the second annular groove 28 and the second annular lip 26 will be in locking engagement with the first annular groove 23. The first offset 22 will also be in locking engagement with the second offset 27. Thus, after assembly the lower seal wear ring 6 will be in locking engagement with the inner ring 1.

It is appreciated that while the dimensions shown in FIG. 2 show one embodiment of the locking arrangement, these dimensions may be adjusted to increase or decrease the fit between the lower seal wear ring 6 and the inner ring 1. In fact, interference fits of this type are well known in the art and the dimensions may be adjusted as needed for a specific application without departing from the scope of the present invention. It is also appreciated that the method of connecting the lower seal wear ring 6 to the inner ring 1 may be in any manner sufficient to effectively engage these two components to create a unitary assembly. For example, the method of connection could include, welding, bonding, riveting, bolting, or shrink fitting as long as the resulting assembly is aligned and true. In yet other embodiments, the lower seal wear ring 6 may be completed integrated into the inner ring 1 by being machined as only one piece. Regardless of the method of attachment, however, the size of the central bore 15 of the inner ring 1 will be the same size as the central bores 45 and 46 of the lower seal wear ring 6 and the upper seal wear ring 5 respectively. Additionally, the overall configuration of the inner ring 1 and the upper seal wear ring 5 and the lower seal wear ring 6 are such that when these three components are assembled, the central bore 15 is in concentric and dimensional alignment with the central bores 45 and 46.

Referring again to FIG. 1, the lower seal wear ring 6 and the upper seal wear ring 5 each have a seal wear surface 30. A seal carrier 10 is attached to a front face 31 and to a back face 32 of the outer ring 2. The outer ring 2 has two snap steps 33 which engage with the flanges 34 of the seal carriers 10 to hold the seal carriers 10 onto the faces of the outer ring 2. Two contact lip seals 9 are positioned between the seal carriers 10 and the seal wear surfaces of the upper seal wear ring 5 and the lower seal wear ring 6 where the contact lip seals 9 are in wiping contact with the seal wear surfaces 30. In the preferred embodiment, the contact lip seals 9 have a lip and a case to partially encase the lip.

Due to the design of the contact lip seal 9, the orientation of the contact lip seal can assist in the operation of the bearing assembly A. In particular, the contact lip seal 9 is better at retaining lubricants within the bearing assembly A if the contact lip 9A faces toward the retained lubricant as shown in FIG. 1. Similarly, the contact lip 9A works better to prevent the entrance of contamination into the bearing assembly A if the contact lip 9A faces toward the potential contaminants. Thus, the first embodiment of the present invention described herein would have both contact lip seals 9 oriented as shown in FIG. 1. However, a second embodiment would have the contact lip seal 9 which contacts the upper seal wear ring 5 be reversed such that the contact lip 9A would face away from the inner ring 1 to better prevent potential contaminants from entering the bearing assembly A. Therefore, in the second embodiment, the lower contact lip seal 9 would be oriented to better retain the lubricant within the bearing assembly A, while the upper contact lip seal 9 would be oriented to better prevent the entrance of contaminants into the bearing assembly A. Yet other embodiments related to the orientations of the contact lip seals 9 would still remain within the scope of the present invention.

The lower closure ring 8 is attached to the lower seal wear ring 6 and the upper closure ring 7 is attached to the upper seal wear ring 5. The lower closure ring 8 has a flange 35, a flange surface 38, an offset surface 36, and a ring surface 37 having a flange tip 39. The inside diameter of the flange surface 38 is sized to create an interference fit with the annular surface 40 of the lower seal wear ring 6 to allow the lower closure ring 8 to be attached to the lower seal wear ring 6. The offset surface 36 is angled toward the back face 32 of the outer ring 2 at angle of about 45 degrees. It will be appreciated that the angle may vary from about 30 degrees to about 60 degrees and still be within the scope of the present invention. The length of the ring surface 37 is such that the flange tip 39 is set back from the seal carrier 10 a sufficient amount to allow for the maximum axial misalignment of the inner ring 1 from the outer ring 2 without contact occurring between the seal carrier 10 and the flange tip 39. While the result will be a gap between the flange tip 39 and the seal carrier 10, the gap must be small enough to resist the entrance of contaminants into the bearing assembly. The flange tip 39 prevents damage from occurring to the contact lip seals 9 when the outer ring 2 is inclined during the handling and installation of the bearing.

The upper closure 7 is ring-shaped and has an inside diameter 41 sized to create an interference fit between the inside diameter 41 of the upper closure 7 and the annular surface 40 of the upper wear ring 5. The upper closure 7 has an observation opening 42 having a dimension of about 4.00 inches by about 3.00 inches. An inspection plate 43 covers the observation opening 42 and is attached to the upper closure 7 by two fasteners 44. Upon installation of the spherical roller bearing A onto the shaft 16 of the dragline machine, maintenance personnel will occasionally remove the fasteners 44 and the inspection plate 43 to examine the condition of the spherical roller bearing A.

The upper seal wear ring 5 and the lower seal wear ring 6 have a series of tapped lifting holes 47 which are used to mount the lifting eye bolts for handling the spherical roller bearing A. While the tapped lifting holes 47 are used in this embodiment, it will be appreciated that any type of lifting method may be used to lift and handle to spherical roller bearing A and still remain within the scope of the present invention.

Figure 3:
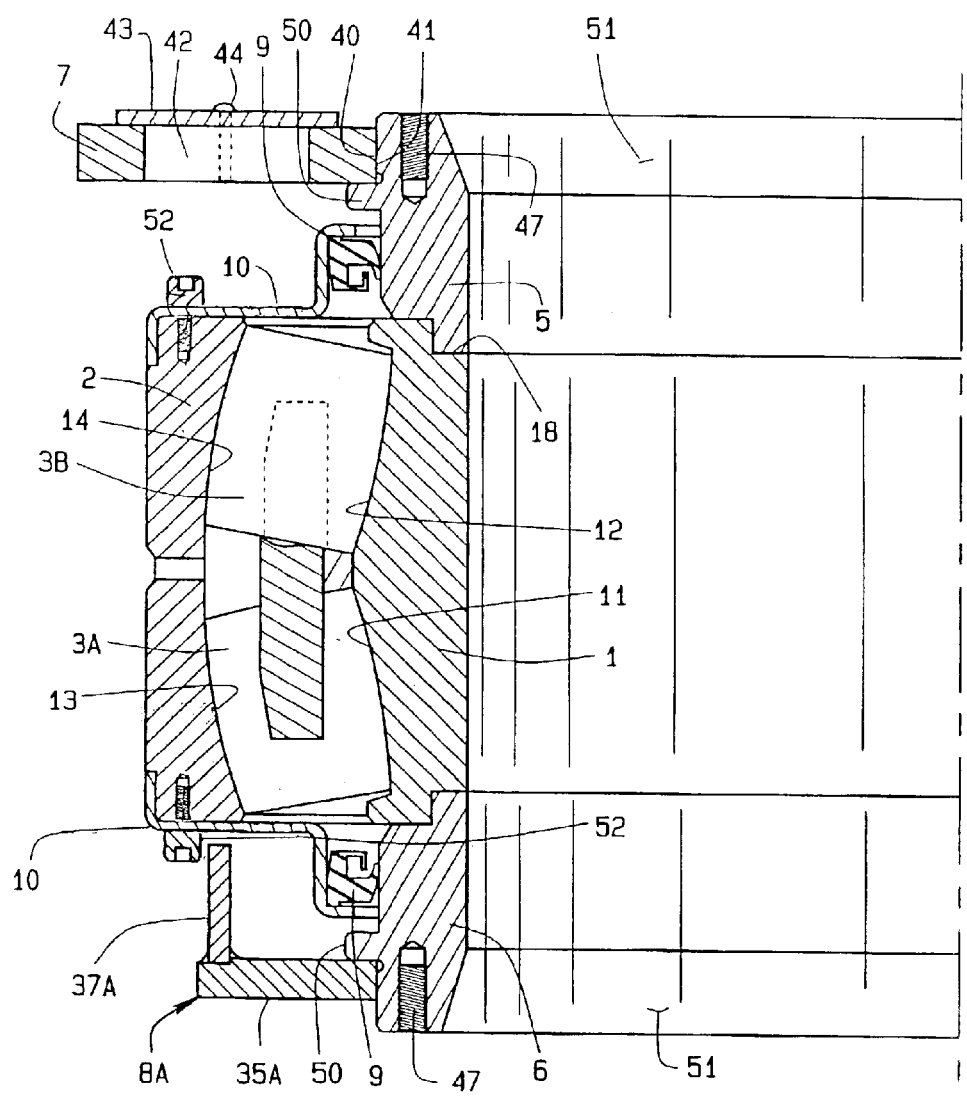
FIG. 3 is a section view of the spherical roller bearing showing an alternative embodiment of the present invention.

FIG. 3 shows an alternative embodiment, the present invention. This embodiment is the same as the previous embodiment with the exception of the configuration of the bottom closure ring and the method of installing the present invention into a dragline excavating machine.

The bottom closure ring 8A of the alternative embodiment comprises a washer 35A and a ring 37A in a welded assembly. It will be appreciated that other configurations of the bottom closure ring 8 are also acceptable provided that the configuration contacts the annular surface 40 of lower seal wear ring 6 and the gap between the bottom closure seal ring 8 and the surface of the seal carrier 10 resists the entrance of debris and contamination through the gap.

The alternative embodiment also incorporates a design wherein the upper closure ring 7 and the upper seal wear ring 5 have matching threads which allow the upper closure ring 7 to be removed from the upper seal wear ring 5 by unscrewing the upper closure ring 7 from the upper seal wear ring 5. The upper closure ring 7 can also be tack welded to the upper seal wear ring 5 for a semi-permanent between the components. When a need to remove the upper closure ring 7 arises, the tack welds can be ground off the upper closure ring can be unscrewed from the upper seal wear ring 5.

The alternative embodiment of FIG. 3 also shows two annular protrusions 50, one on the lower seal wear ring 6 and one on the upper seal wear ring 5. The annular protrusions 50 assists in guarding against the entrance of contaminants into the bearing assembly A and also act as a locator for placement of the lower closure ring 8A on the lower seal ring 6 and for the upper closure ring 7 on the upper seal wear ring 5.

FIG. 3 also shows a plurality of fasteners 52. The plurality of fasteners 52 are used to fasten the two seal carriers 10 to the outer ring 2. Also shown are two annular beveled surfaces 51 which are located on the inner ring 1. The two annular beveled surfaces 51 assist in the installation of the bearing assembly A onto the dragline shaft 16.

It will be appreciated that aspects of the embodiments of the present invention as shown in FIG. 1 and FIG. 3 may be combined in various combinations to generate other alternative embodiments while staying within the scope of the present invention.

While the above description describes various embodiments of the present invention, it will be clear that the present invention may be otherwise easily adapted to fit any configuration where a spherical roller bearing may be utilized.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. A sealed spherical roller bearing for a dragline swing shaft on a dragline excavating machine comprising:

an outer ring;

an inner ring having a central bore sized to match a dragline swing shaft;

a first plurality of spherical rolling elements and a second plurality of spherical rolling elements each of which is interposed between the inner ring and the outer ring;

an upper seal wear ring;

a lower seal wear ring;

an upper closure ring;

a lower closure ring;

at least one contact lip seal; and at least one contact lip seal carrier.

2. The sealed spherical roller bearing of claim 1 wherein each of the inner ring and the outer ring have a first inclined raceway and a second inclined raceway such that the first inclined raceway is spaced from and oppositely inclined to the second inclined raceway, and each of the first and second raceways have a curvature conforming to the curvature of each of the first and second plurality of spherical rolling elements.

3. The sealed spherical roller bearing of claim 2 wherein the first plurality of spherical rolling elements contacts and rolls on the first inclined raceways and the second plurality of spherical rolling elements contacts and rolls on the second inclined raceways.

4. The sealed spherical roller bearing of claim 3 further wherein each of the first plurality of spherical rolling elements and the second plurality of rolling elements is spaced by a cage.

5. The sealed spherical roller bearing of claim 4 wherein there is a locking engagement between the lower seal wear ring and the inner ring, and between the upper seal wear ring and the inner ring.

6. The sealed spherical roller bearing of claim 5 further comprising a first locking offset in a front face of the inner ring, the first locking offset being located and configured to operatively engage and lock onto a first locking shoulder on the upper seal wear ring.

7. The sealed spherical roller bearing of claim 6 further comprising a second locking offset in a back face of the inner ring, the second locking offset being located and configured to operatively engage and lock onto a second locking shoulder on the lower seal wear ring.

8. The sealed spherical roller bearing of claim 7 wherein each of the first and second locking shoulders comprise an annular lip, a first offset, a first annular groove, a first annular face, and a first offset face.

9. The sealed spherical roller bearing of claim 8 wherein each of the first and second locking offsets comprise a second annular lip, a second offset, a second annular groove, a second offset face, and a front face.

10. The sealed spherical roller bearing of claim 9 wherein there is an interference fit between the upper seal wear ring and the inner ring, and between the lower seal wear ring and the inner ring.

11. The sealed spherical roller bearing of claim 10 wherein each of the lower seal wear ring and the upper seal wear ring have a seal wear surface.

12. The sealed spherical roller bearing of claim 11 wherein the at least one contact lip seal carrier is attached to the outer ring.

13. The sealed spherical roller bearing of claim 12 wherein the outer ring has a front face and a back face, and wherein the at least one contact lip seal carrier is attached to the front face of the outer ring and another at least one contact lip seal carrier is attached to the back face of the outer ring.

14. The sealed spherical roller bearing of claim 13 further comprising at least one contact lip seal positioned between one of either the at least one contact lip seal carrier and one of either the front face of the outer ring or the back face of the outer ring.

15. The sealed spherical roller bearing of claim 14 wherein the at least on contact lip seal has a lip and a case which partially encase the contact lip seal.

16. The sealed spherical roller bearing of claim 15 wherein there are two contact lip seals, one located between a first contact lip seal carrier and the wear surface of the upper seal wear ring, and one located between a second contact lip seal carrier and the wear surface of the lower seal wear ring.

17. The sealed spherical roller bearing of claim 16 wherein the contact lip seal includes an outer face for compressive contact with an inner surface of the seal carrier, and an inner lip for contacting the wear surface of one of either the upper seal wear ring or the lower seal ring.

18. The sealed spherical roller bearing of claim 17 wherein an end tip of the inner lip of each of the two contact lip seal points generally toward the horizontal center line of the inner ring.

19. The sealed spherical roller bearing of claim 17 wherein the end tip of the inner lip contacting the wear surface of the upper seal wear ring points generally away from the horizontal centerline of the inner ring, and the end tip of the inner lip contacting the wear surface of the lower seal wear ring generally points toward the horizontal center line of the inner ring.

20. The sealed spherical roller bearing of claim 17 wherein the outer ring has at least one snap-step configuration to engage a flange on the at least one contact lip seal carrier to the outer ring.

21. The sealed spherical roller bearing of claim 17 wherein the at least one contact lip seal carrier is attached to the outer ring with a plurality of fasteners.

22. The sealed spherical roller bearing of claim 21 wherein the upper closure ring and the upper seal wear ring have matching threads which allow the upper closure ring to be removed from the upper seal ring by unscrewing the upper closure ring from the upper seal wear ring.

23. The sealed spherical roller bearing of claim 17 wherein the upper closure ring has an inside diameter sized to create an interference fit between the inside of the upper closure ring and an annular surface of the upper seal wear ring.

24. The sealed spherical roller bearing of claim 23 wherein the upper closure ring comprises an observation opening.

25. The sealed spherical roller bearing of claim 24 further comprising an inspection plate which covers the observation opening, the inspection plate being attached to the upper closure ring by at least one fastener.

26. The sealed spherical roller bearing of claim 25 wherein the lower closure ring is attached to the lower seal wear ring and the upper closure ring is attached to the upper seal wear ring.

27. The sealed spherical roller bearing of claim 26 wherein the lower closure ring has a flange with an inside diameter, a flange surface, an offset surface, and a ring surface with a flange tip.

28. The sealed spherical roller bearing of claim 27 wherein the inside diameter of the flange is sized to create an interference fit with an annular surface of the lower seal wear ring, the interference fit allowing the lower closure ring to be attached to the lower seal wear ring.

29. The sealed spherical roller bearing of claim 28 wherein the offset surface of the lower closure ring is angled toward the back face of the outer ring at an angle of between about thirty-five degrees and about sixty degrees.

30. The sealed spherical roller bearing of claim 29 wherein there is a gap between the flange tip of the lower closure ring and the at least one contact lip seal carrier to allow for axial misalignment between the inner ring and the outer ring without contact occurring between the flange tip and the at least one contact lip seal carrier.

31. The sealed spherical roller bearing of claim 30 wherein the upper seal ring and the lower seal ring each include a plurality of tapped lifting holes which are used to mount lifting eye bolts for handling the spherical roller bearing.

32. The sealed spherical roller bearing of claim 26 wherein the lower closure ring comprises a washer and a ring.

33. The sealed spherical roller bearing of claim 32 wherein the washer and ring are connected in a welded assembly.

34. The sealed spherical roller bearing of claim 33 wherein the washer of the bottom closure ring has an inside diameter.

35. The sealed spherical roller bearing of claim 34 wherein the inside diameter of the washer is sized to create an interference fit with an annular surface of the lower seal wear ring, the interference fit allowing the lower closure ring to be attached to the lower seal wear ring.

36. The sealed spherical roller bearing of claim 35 wherein there is a gap between an inner edge of the washer and the at least one contact lip seal carrier to allow for axial misalignment between the inner ring and the outer ring without contact occurring between the inner edge of the washer and the at least one contact lip seal carrier.

37. The sealed spherical roller bearing of claim 36 further comprising two annular beveled surfaces located on the inner ring, the two beveled annular acting to locate the upper closure ring and the lower closure ring on the inner ring.

38. A sealed spherical roller bearing for a dragline swing shaft on a dragline excavating machine comprising:
a spherical bearing comprising an outer ring, an inner ring having a central bore sized to match a dragline swing shaft, a first plurality of spherical rolling elements and a second plurality of spherical rolling elements each of which is interposed between the inner ring and the outer ring; and means for preventing the entrance of contamination into the spherical bearing.

39. The sealed spherical roller bearing of claim 38 further comprising means for to engage the lower seal wear ring with the inner ring in a locking engagement.

40. The sealed spherical roller bearing of claim 39 further comprising means for to engage the upper seal wear ring with the inner ring in a locking engagement.

41. The sealed spherical roller bearing of claim 40 wherein the means for preventing the entrance of contamination into the spherical bearing comprises an upper seal wear ring and a lower seal wear ring.

42. The sealed spherical roller bearing of claim 41 wherein each of the upper seal wear ring and the lower seal wear ring have a seal wear surface.

43. The sealed spherical roller bearing of claim 42 further comprising at least one contact lip seal carrier.

44. The sealed spherical roller bearing of claim 43 wherein the at least one contact lip seal carrier is attached to the outer ring by operative engagement of at least one snap step on the outer ring and at least one flange on the at least one contact lip seal carrier.

45. The sealed spherical roller bearing of claim 44 further comprising at least one contact lip seal positioned between the at least one contact lip seal carrier and a wear surface of one of either the upper seal wear ring of the lower seal wear ring.

46. The sealed spherical roller bearing of claim 45 wherein the means for preventing the entrance of contamination into the spherical bearing comprises an upper closure ring and a lower closure ring.

47. The sealed spherical roller bearing of claim 46 wherein the at least one contact lip seal carrier is attached to the outer ring with a plurality of fasteners.

48. The sealed spherical roller bearing of claim 47 further comprising two annular beveled surfaces located on the inner ring, the two beveled annular acting to locate the upper closure ring and the lower closure ring on the inner ring.

* * * * *